(12) United States Patent
Fujinaka et al.

(10) Patent No.: US 11,940,640 B2
(45) Date of Patent: Mar. 26, 2024

(54) POLARIZING SHEET AND POLARIZING LENS PROVIDED WITH SAME

(71) Applicant: DAICEL-EVONIK LTD., Tokyo (JP)

(72) Inventors: Toshihiko Fujinaka, Tokyo (JP); Hitomi Omae, Tokyo (JP)

(73) Assignee: DAICEL-EVONIK LTD., Tokyo (JP)

( * ) Notice: Subject to any disclaimer, the term of this patent is extended or adjusted under 35 U.S.C. 154(b) by 0 days.

(21) Appl. No.: 18/074,211

(22) Filed: Dec. 2, 2022

(65) Prior Publication Data

US 2023/0089288 A1 Mar. 23, 2023

Related U.S. Application Data

(62) Division of application No. 16/645,156, filed as application No. PCT/JP2018/032651 on Sep. 3, 2018, now abandoned.

(30) Foreign Application Priority Data

Sep. 7, 2017 (JP) .................. 2017-171788

(51) Int. Cl.
*G02B 5/30* (2006.01)
*G02B 1/04* (2006.01)
*G02C 7/12* (2006.01)

(52) U.S. Cl.
CPC ............. *G02B 5/305* (2013.01); *G02B 1/041* (2013.01); *G02B 5/3083* (2013.01); *G02C 7/12* (2013.01)

(58) Field of Classification Search
CPC ........ G02B 5/305; G02B 5/3083; G02B 5/30; G02B 5/3025–3041; G02B 1/041; G02B 1/04; G02C 7/12; B29D 11/00644; B29D 11/0073; B29D 11/0048; B29D 11/0049; B29D 11/00548; B32B 1/00; B32B 7/023; B32B 27/34
See application file for complete search history.

(56) References Cited

U.S. PATENT DOCUMENTS 8,440,317 B2 5/2013 Tsukane et al.
8,703,298 B2 4/2014 Fujinaka et al.
(Continued)

FOREIGN PATENT DOCUMENTS

EP 3521875 A1 8/2019
EP 3654078 A1 5/2020
(Continued)

OTHER PUBLICATIONS

Extended European Search Report for European Application No. 18852824.4, dated Apr. 14, 2021.
(Continued)

*Primary Examiner* — Stephone B Allen
*Assistant Examiner* — Adam W Booher
(74) *Attorney, Agent, or Firm* — Birch, Stewart, Kolasch & Birch, LLP

(57) ABSTRACT

Provided is a polarizing sheet that can precisely impart a desired curved shape without causing whitening when bending is carried out. A polarizing sheet of an embodiment of the present invention having a structure in which a polyamide resin film (1), a polarizing film, and a polyamide resin film (2) are laminated in this order, wherein a retardation value of the polyamide resin film (1) is from 10 to 3000 nm, and the retardation value of the polyamide resin film (1) and a retardation value of the polyamide resin film (2) satisfy Formula (r):

[Retardation Value of Polyamide Resin Film (1)]−
[Retardation Value of Polyamide Resin Film (2)]≥10 nm          (r).

6 Claims, 2 Drawing Sheets

(56) References Cited

U.S. PATENT DOCUMENTS

| | | | |
|---|---|---|---|
| 11,409,025 B2 | 8/2022 | Kimura et al. | |
| 2007/0148482 A1 | 6/2007 | Fujinaka et al. | |
| 2008/0094707 A1 | 4/2008 | Tsukane et al. | |
| 2015/0248023 A1* | 9/2015 | Kimura | B29D 11/00644 351/49 |
| 2019/0283349 A1* | 9/2019 | Oya | G02B 1/14 |
| 2020/0174159 A1 | 6/2020 | Kimura et al. | |

FOREIGN PATENT DOCUMENTS

| | | |
|---|---|---|
| JP | 8-313701 A | 11/1996 |
| JP | 2006-227591 A | 8/2006 |
| JP | 2007-93649 A | 4/2007 |
| JP | 2007-178920 A | 7/2007 |
| JP | 2011-180266 A | 9/2011 |
| WO | WO 2006/040954 A1 | 4/2006 |

OTHER PUBLICATIONS

International Search Report dated Oct. 16, 2018, in PCT/JP2018/032651.
Written Opinion of the International Searching Authority dated Oct. 16, 2018, in PCT/JP2018/032651.
Japanese Office Action for Japanese Application No. 2022-021233, dated Feb. 21, 2023.

* cited by examiner

POLARIZING SHEET AND POLARIZING LENS PROVIDED WITH SAME

TECHNICAL FIELD

The present invention relates to a polarizing sheet and a polarizing lens provided with the polarizing sheet. The present application is a Divisional of copending application Ser. No. 16/645,156, filed on Mar. 6, 2020, which is the U.S. National Phase of PCT International Application No. PCT/JP2018/032651, filed on Sep. 3, 2018, which claims priority under 35 U.S.C. § 119(a) to JP 2017-171788, filed in Japan on Sep. 7, 2017, all of which are hereby expressly incorporated by reference into the present application.

BACKGROUND ART

A polarizing lens is used for example as sunglasses and goggles during outdoor activities such as mountain-climbing, skiing, snowboarding, fishing and baseball and in driving vehicles to shield reflected light from ground surfaces, snow surfaces or water surfaces. This polarizing lens has a structure in which a polarizing film is laminated on the lens itself.

In Patent Document 1, described are polarizing lenses obtained by laminating a polyamide resin-molded layer on one surface of a polarizing sheet, including a polarizing lens 1 formed from a laminate of a stretched polyamide resin film/a polarizing film/a stretched polyamide resin film/a polyamide resin-molded layer, and a polarizing lens 2 formed from a laminate of a unstretched polyamide resin film/a polarizing film/a unstretched polyamide resin film/a polyamide resin-molded layer, and the polarizing lenses 1 and 2 are excellent in chemical resistance and resistant to distortion of images or color irregularity, and the polarizing lens 1 can prevent whitening, which is called a butterfly mark, after bending.

CITATION LIST

Patent Document

Patent Document 1: JP 2007-178920 A

SUMMARY OF INVENTION

Technical Problem

The inventors of the present invention found that a stretched polyamide resin film shrinks according to its stretching ratio and softens and deforms according to its heat exposure temperature upon heated. Meanwhile, when a polarizing sheet formed from a stretched polyamide resin film/a polarizing film/a stretched polyamide resin film is subjected to bending using a heated mold, a difference in the exposure temperature of the stretched polyamide resin film over one surface and over the other surface occurs, causing the side exposed to a higher temperature to soften and deform easily, while the other side to deform not as easily by comparison with the former, resulting in difficulties in carrying out precise bending.

Therefore, an object of the present invention is to provide a polarizing sheet that can precisely impart a desired curved shape without causing whitening when bending is carried out.

Another object of the present invention is to provide a polarizing lens having a curved shape with excellent precision without causing whitening.

Another object of the present invention is to provide spectacles (glasses) that have good appearance with polarizing lenses having a curved shape with excellent precision without whitening.

Solution to Problem

As a result of diligent research to solve the problems described above, the inventors of the present invention found the following for a polarizing sheet having a laminate of a polyamide resin film (1)/a polarizing film/a polyamide resin film (2):

1. Bending can be carried out without causing whitening by setting at least one of retardation values of the polyamide resin film (1) or (2) to be from 10 to 3000 nm.

2. Each of the polyamide resin films (1) and (2) has heat-shrinkability corresponding to its retardation value; however, to enable precise bending when carrying out bending using a heated mold, setting a retardation value of a polyamide resin film on the side that is directly in contact with the mold (i.e. the side that is exposed to a higher temperature) to be at least 10 nm greater than a retardation value of the polyamide resin film on the opposite side can eliminate a difference in an amount of deformation caused by a difference in the heat exposure temperatures of the polyamide resin films (1) and (2) (that is, an amount of deformation due to a difference between thermal expansion and thermal shrinkage).

The present invention has been completed based on these findings.

That is, an embodiment of the present invention provides a polarizing sheet including a polyamide resin film (1), a polarizing film and a polyamide resin film (2), the polarizing sheet having a structure in which the polyamide resin film (1), the polarizing film and the polyamide resin film (2) are laminated in this order, wherein a retardation value of the polyamide resin film (1) is from 10 to 3000 nm, and the retardation value of the polyamide resin film (1) and a retardation value of the polyamide resin film (2) satisfy Formula (r) below:

[Retardation Value of Polyamide Resin Film (1)]−
[Retardation Value of Polyamide Resin Film (2)]≥10 nm    (r)

An embodiment of the present invention provides the polarizing sheet in which a thickness of the polyamide resin film (2) is from 10 to 2000 μm.

An embodiment of the present invention provides the polarizing sheet in which a polyamide resin is an alicyclic polyamide resin.

An embodiment of the present invention provides the polarizing sheet in which the alicyclic polyamide resin has a repeating unit represented by Formula (ad) below.

[Chem. 1]

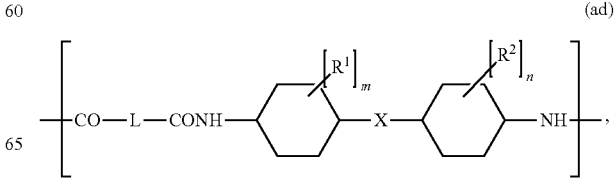

(where X represents a single bond or a divalent hydrocarbon group, L represents a divalent hydrocarbon group, $R^1$ and $R^2$ each represent an alkyl group, and m and n each represent an integer from 0 to 4.)

An embodiment of the present invention provides the polarizing sheet having a curved shape.

An embodiment of the present invention provides a polarizing lens having a structure in which a polyamide resin-molded layer is laminated on a surface of the polyamide resin film (2) of the polarizing sheet described above.

An embodiment of the present invention provides spectacles having the polarizing lens described above.

In the present specification, a retardation value (Δn·d) of a film is defined as a product of a birefringence (Δn) and a thickness (d).

Advantageous Effects of Invention

The polarizing sheet according to an embodiment of the present invention has a laminate structure including a polyamide resin film (1)/a polarizing film/a polyamide resin film (2). For the polyamide resin film (1), a polyamide resin film with such a strain that the retardation value is in a range from 10 to 3000 nm is used (e.g., a polyamide resin film to which stretching is carried out), and therefore, in a case where this polarizing sheet is subjected to bending, whitening can be prevented, as the strain imparted to the polyamide resin film (1) cancels out the stress applied by the bending.

Furthermore, to cancel out the difference in the amount of deformation due to the difference in the heat exposure temperatures of the polyamide resin films (1) and (2), the retardation values of the polyamide resin films (1) and (2) are set to conform with Formula (r) below:

[Retardation Value of Polyamide Resin Film (1)]–
[Retardation Value of Polyamide Resin Film (2)]≥10 nm   (r)

Therefore, formation of a curved shape with excellent precision is possible when bending is carried out with a side of the polyamide resin film (1) being disposed to be in direct contact with a heated mold due to a larger heat-shrinkability compared to the polyamide resin film (2).

Furthermore, because the polarizing sheet according to an embodiment of the present invention is formed from a polyamide resin, the polarizing sheet is light-weight, less likely to crack when a hole is directly formed, and excellent in processability. Furthermore, chemical resistance is also excellent.

Therefore, when the polarizing sheet according to an embodiment of the present invention is used, a polarizing lens having a curved shape with excellent precision and having no whitening can be produced, and the spectacles provided with the polarizing lenses (e.g., sunglasses and goggles) are light-weight, excellent in appearance, resistant to distortion of images, and gentle on eyes when worn for a long period of time.

DESCRIPTION OF EMBODIMENTS

Polarizing Sheet

Figure 1:
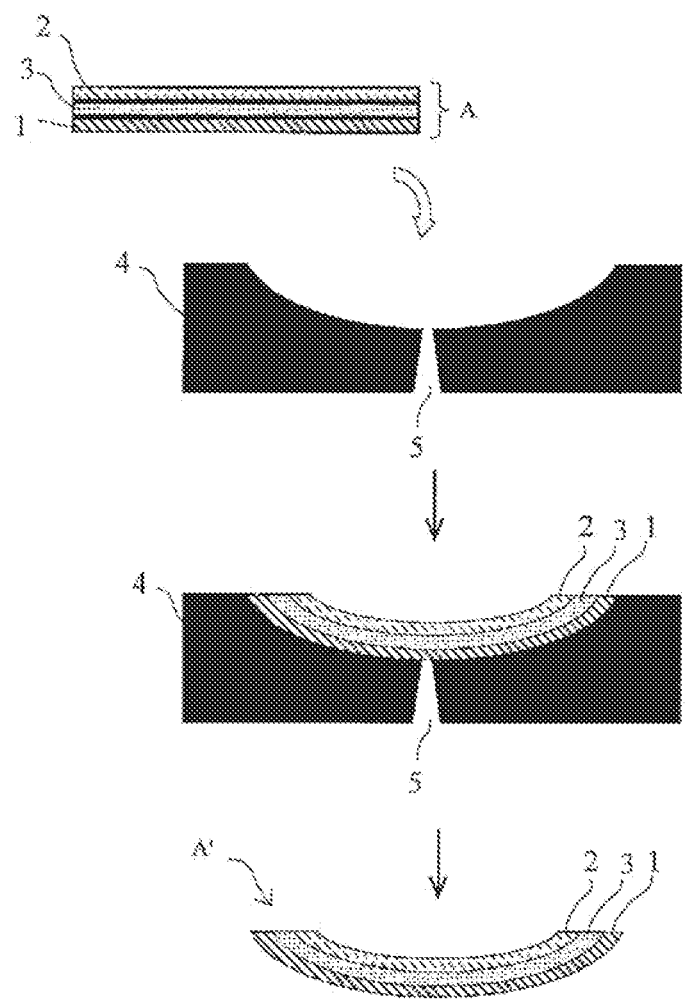
FIG. 1 is a schematic process chart illustrating an example of the production method of a polarizing sheet according to an embodiment of the present invention.

A polarizing sheet according to an embodiment of the present invention including a polyamide resin film (1), a polarizing film and a polyamide resin film (2), the polarizing sheet having a structure in which the polyamide resin film (1), the polarizing film and the polyamide resin film (2) are laminated in this order, where a retardation value of the polyamide resin film (1) is from 10 to 3000 nm, and the retardation value of the polyamide resin film (1) and a retardation value of the polyamide resin film (2) satisfy Formula (r) below:

[Retardation Value of Polyamide Resin Film (1)]–
[Retardation Value of Polyamide Resin Film (2)]≥10 nm   (r)

Polyamide Resin Film

A polyamide resin film is a film formed from one kind of polyamide resin, or two or more kinds of polyamide resins. Furthermore, the polyamide resin film (1) and the polyamide resin film (2) may be each formed from the same polyamide resin or a different polyamide resin.

The polyamide resin is a polymer in which a multiple number of monomers are bonded through amide bonding, such a resin including a polycondensation product of monomers such as a diamine component and a dicarboxylic acid component, and a ring-opening polymerization product of monomers such as lactams. The diamine component and the dicarboxylic acid component each may be used in a combination of one kind alone, or in a combination of two or more kinds. Furthermore, one kind of lactams, or a combination of two or more kinds of lactams may be used.

Examples of the diamine component include compounds represented by Formula (a) below.

[Chem. 2]

$$H_2N\text{-}L^1\text{-}NH_2 \quad (a)$$

(In the formula, $L^1$ represents a divalent hydrocarbon group.)

The divalent hydrocarbon group includes a divalent aliphatic hydrocarbon group, a divalent alicyclic hydrocarbon group and a divalent aromatic hydrocarbon group.

Examples of the divalent aliphatic hydrocarbon group include straight-chain or branched alkylene groups having from 1 to 20 carbons, such as a methylene group, a methylmethylene group, a dimethylmethylene group, an ethylene group, a propylene group, and a trimethylene group; straight-chain or branched alkenylene groups having from 2 to 20 carbons, such as vinylene, 1-methylvinylene, propenylene, 1-butenylene, 2-butenylene, 1-pentenylene, and 2-pentenylene groups; and straight-chain or branched alkynylene groups having from 2 to 20 carbons, such as ethynylene, propynylene, 3-methyl-1-propynylene, butynylene, 1,3-butadiynylene group, 2-pentynylene, 2-pentynylene, 2,4-pentadiynylene, 2-hexynylene, 1,3,5-hexatriynylene, 3-heptynylene, 4-octynylene, 4-nonynylene, 5-decynylene, 6-undecynylene, and 6-dodecynylene groups.

The divalent alicyclic hydrocarbon group is a group obtained by removing two hydrogen atoms from the structural formula of an alicycle, and examples of the alicycle include 3 to 20-membered cycloalkane rings, such as cyclopropane, cyclopentane, cyclohexane, cycloheptane and cyclooctane rings; 3 to 20-membered cycloalkene rings, such as cyclopentene and cyclohexene rings; and crosslinking rings, such as perhydronaphthalene, norbornane, norbornene, adamantane, tricyclo[5.2.1.0$^{2,6}$]decane and tetracyclo[4.4.0.1$^{2,5}$.1$^{7,10}$]dodecane rings. The alicycle may have a substituent (e.g., an alkyl group having from 1 to 5 carbons). Furthermore, two or more alicycles may be bonded through a single bond or a linking group (e.g., a divalent aliphatic hydrocarbon group).

The divalent aromatic hydrocarbon group is a group obtained by removing two hydrogen atoms from a structural formula of an aromatic ring, and examples of the aromatic ring include aromatic rings having from 6 to 20 carbons, such as benzene, naphthalene, anthracene, and fluorene rings. The aromatic ring may have a substituent (e.g., an alkyl group having from 1 to 5 carbons, a cycloalkyl group having from 3 to 6 carbons). Furthermore, two or more aromatic rings may be bonded through a single bond or a linking group (e.g., a divalent aliphatic hydrocarbon group or a divalent alicyclic hydrocarbon group).

Examples of the compound in which $L^1$ in Formula (a) above is a divalent aliphatic hydrocarbon group (that is, aliphatic diamine) include hexamethylenediamine and trimethylhexamethylenediamine.

Examples of the compound in which $L^1$ in Formula (a) above is a divalent alicyclic hydrocarbon group (that is, alicyclic diamine) include bis(p-aminocyclohexyl)methane and bis(4-amino-3-methylcyclohexyl)methane.

Examples of the compound in which $L^1$ in Formula (a) above is a divalent aromatic hydrocarbon group (that is, aromatic diamine) include m-xylylenediamine.

Examples of the dicarboxylic acid component include compounds represented by Formula (c) below.

[Chem. 3]

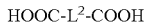

HOOC-L$^2$-COOH        (c)

(In the formula, $L^2$ represents a divalent hydrocarbon group.)

The divalent hydrocarbon group of $L^2$ take the same examples as those for the divalent hydrocarbon group of $L^1$.

Examples of the compound in which $L^2$ in Formula (c) above is a divalent aliphatic hydrocarbon group (that is, aliphatic dicarboxylic acid) include adipic acid and dodecanedioic acid.

Examples of the compound in which $L^2$ in Formula (c) above is a divalent aliphatic hydrocarbon group (that is, alicyclic dicarboxylic acid) include cyclohexane-1,4-dicarboxylic acid.

Examples of the compound in which $L^2$ in Formula (c) above is a divalent aromatic hydrocarbon group (that is, aromatic dicarboxylic acid) include isophthalic acid and terephthalic acid.

Examples of the lactams include lactams having a 3 to 13-membered ring, such as α-lactam, β-lactam, γ-lactam, δ-lactam, ε-caprolactam, and ω-laurolactam.

According to an embodiment of the present invention, an alicyclic polyamide resin [that is, polycondensation product of a diamine component and a dicarboxylic acid component and at least one of the diamine component or the dicarboxylic acid component is a compound having an alicyclic structure (e.g., an alicyclic diamine, an alicyclic dicarboxylic acid)] is preferred from the perspectives of excellent transparency, chemical resistance, impact resistance, oil resistance and dimensional stability.

For the alicyclic polyamide resin, particularly a polycondensation product of an alicyclic diamine and an aliphatic dicarboxylic acid are preferred, and especially a polycondensation product having a repeating unit represented by Formula (ad) below is preferred.

[Chem. 4]

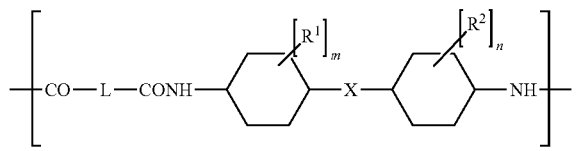

(In the formula, X represents a single bond or a divalent hydrocarbon group, and L represents a divalent hydrocarbon group. $R^1$ and $R^2$ each represent an alkyl group, and m and n each represent an integer from 0 to 4.)

X and L in the divalent hydrocarbon group can each take the same examples as those for the divalent hydrocarbon group of $L^1$. X and L may be the same or different.

$R^1$ and $R^2$ each represent an alkyl group, and the examples include straight-chain or branched alkyl groups having from 1 to 5 carbons, such as methyl, ethyl, propyl and isopropyl group. $R^1$ and $R^2$ may be the same or different. Furthermore, when m or n takes an integer of 2 or greater, two or more of the respective $R^1$ or $R^2$ may be the same or different. In an embodiment of the present invention, among these, both m and n are preferably zero.

The polyamide resin has a weight average molecular weight (calibrated with polystyrene), for example, from 6000 to 300000, and preferably from 20000 to 200000.

Furthermore, the polyamide resin may be crystalline or amorphous. Among these, from the perspective of excellent transparency, a polyamide resin with a low crystallinity, a microcrystalline polyamide resin having a crystal size that is smaller than the wavelength of light, or an amorphous polyamide (amorphous nylon or microcrystalline polyamide) is preferred.

The polyamide resin has a melting temperature (or a glass transition temperature), for example, from 100 to 350° C., and preferably approximately from 100 to 320° C.

The polyamide resin typically has a high Abbe number, which is, for example, 35 or greater (e.g., from 35 to 65), preferably 40 or greater (e.g., from 40 to 65), more preferably 45 or greater (e.g., from 45 to 60), and particularly 50 or greater (e.g., from 50 to 60).

Furthermore, the polyamide resin has a refractive index of, for example, from 1.1 to 2.0, preferably from 1.2 to 1.9, and more preferably from 1.3 to 1.8.

A material with a high Abbe number tends to have a lower refractive index. However, the polyamide resin has both a high Abbe number and a high refractive index, and thus has preferred optical functions in a well-balanced manner.

For the polyamide resin, for example, a commercially available product such as "Trogamid CX7323", available from Daicel-Evonik Ltd., and "Grilamid TR-90", available from EMS-CHEMIE (Japan) Ltd., can be suitably used.

The polyamide resin film (1) and the polyamide resin film (2) may contain resin components besides the polyamide resin (such as publicly known thermoplastic resins) and additives (such as dimming materials, light absorbing agents (e.g., ultraviolet light, blue light and infrared ray), coloring agents, thermal stabilizers, photostabilizers, antioxidants, plasticizers, flame retardants, antistatic agents and viscosity adjusting agents) within ranges not adversely affecting, for example, in terms of optical properties and handleability.

The retardation value of the polyamide resin film (1) is from 10 to 3000 nm. The lower limit of the retardation value is preferably 50 nm, more preferably 100 nm, even more preferably 500 nm, yet even more preferably 1000 nm, yet even more further preferably 1500 nm, and especially yet even more further 2000 nm, from the perspective of achieving especially excellent effect in avoiding whitening after bending. Furthermore, the upper limit of the retardation value is preferably 2800 nm, and more preferably 2500 nm, from the perspectives of avoiding rapid shrinkage due to heating during bending and enhancing precision of the bending.

The difference between the retardation value of the polyamide resin film (1) and the retardation value of the polyamide resin film (2) is 10 nm or greater, and preferably 50 nm or greater, more preferably 100 nm or greater, even more preferably 500 nm or greater, yet even more preferably 1000 nm or greater, yet even more further preferably 1500 nm or greater and especially yet even more further preferably 2000 nm or greater from the perspectives of canceling out the difference between an amount of deformation of the polyamide resin film (1) and an amount of deformation of the polyamide resin film (2) caused by a difference in exposure temperatures so as to carry out more precise bending. Note that the upper limit of the difference in the retardation values is, for example, preferably 3000 nm, and more preferably 2500 nm, from the perspectives of avoiding rapid shrinkage due to heating during bending.

Therefore, the retardation value of the polyamide resin film (2) is, for example, from 0 to 2990 nm. The upper limit of the retardation value is preferably 1000 nm, more preferably 500 nm, even more preferably 300 nm, yet even more preferably 200 nm, yet even more further preferably 100 nm, and especially yet even more further preferably 50 nm, from the perspectives of cancelling a difference from the amount of deformation of the polyamide resin film (1) caused by the difference from the exposure temperature so as to carry out more precise bending.

The polyamide resin film (1) and the polyamide resin film (2) can be formed by extrusion molding methods, cast molding methods and similar molding methods.

The polyamide resin film having a specific retardation value can be produced by subjecting the polyamide resin film to stretching. When the stretching is carried out on the polyamide resin film, the polyamide resin (or polymer) is oriented in one direction and birefringence occurs. Thus, adjusting the stretching ratio tends to yield a polyamide resin film having a corresponding birefringence, and a large stretching ratio tends to yield a polyamide resin film having a large birefringence, and when a thickness is specified, a polyamide resin film having a large retardation value (Δn·d) tends to be obtained.

The stretching is carried out by a roll method, a tenter method, a tube method or similar methods. The stretching temperature is, for example, approximately from 80 to 250° C., preferably approximately from 110 to 250° C., and more preferably approximately from 120 to 200° C.

The thickness of the polyamide resin film (2) is, for example, approximately from 10 to 2000 µm. The thickness of 10 µm or greater is preferred from the perspective of preventing discoloration as a result of heat reaching the polarizing film when a polyamide resin-molded layer is formed by subjecting a heated and melted polyamide resin to injection molding on a surface of the polyamide resin film (2). The thickness is more preferably 50 µm or greater, and particularly preferably 100 µm or greater.

The thickness of the polyamide resin film (1) is, for example, preferably approximately from 50 to 1000 µm from the perspectives of protecting the polarizing film from, for example, impact and contamination, and preventing deterioration of the polarizing film to maintain excellent optical performances. The thickness is more preferably from 100 to 500 µm, and particularly preferably from 100 to 300 µm.

Polarizing Film

A material of the polarizing film is not particularly limited as long as the material is a resin having excellent transparency. In particular, the material is preferably a polyvinyl alcohol resin from the perspectives of excellent transparency and excellent adhesion with the polyamide resin film (1) and the polyamide resin film (2) described above.

The polarizing film may have a single layer or a plurality of layers formed from a combination of the same or different polarizing films.

The polarizing film can be produced by subjecting a polyvinyl alcohol resin to a treatment such as swelling, dyeing, crosslinking or stretching.

The thickness of the polarizing film (a total thickness when the number of layers is two or greater) is, for example, approximately from 5 to 200 µm, and preferably from 10 to 100 µm. When the thickness is 5 µm or greater, desired polarization properties can be imparted. Furthermore, the thickness of 200 µm or less is advantageous from the perspectives of achieving excellent handleability and facilitating reduction in weight and cost.

Production Method of Polarizing Sheet

A polarizing sheet according to an embodiment of the present invention is a polarizing sheet having a structure in which a polyamide resin film (1), a polarizing film and a polyamide resin film (2) are laminated in this order, and can be produced by laminating the films with an adhesive.

The adhesive is not particularly limited, as long as a polyamide resin film and a polarizing film can be bonded with each other, and examples include acrylic adhesives, urethane adhesives (such as urethane ester adhesives and urethane ether adhesives), epoxy adhesives and vinyl acetate adhesives. Among these, urethane adhesives (such as urethane ester adhesives and urethane ether adhesives) are preferably used from the perspective of excellent adhesive strength. For example, a dry laminate adhesive formed from a combination of a main agent, such as an ester-based polyurethane "TM-595", and a curing agent (such as trade names "CAT-10L" and "CAT-RT85"), available from Toyo-Moton, Ltd., are commercially available.

An adhesive is preferably applied in such a manner that the thickness after curing is for example from 0.1 to 80 µm, preferably from 1 to 60 µm and particularly preferably from 5 to 40 µm.

The adhesive can be applied by, for example, printing methods and coating methods. Specific examples include methods such as screen printing methods, mask printing methods, offset printing methods, inkjet printing methods, flexographic printing methods, gravure printing methods, stamping, dispensing, squeegee printing methods, silk screen printing methods, spraying and brushing.

Furthermore, on the surface (face arranged on the opposite side of a face that is in contact with the polarizing film) of the polyamide resin film (1), layers such as a hard coat layer, a dyed layer and a mirror deposited layer may be provided. The surface (face arranged on the opposite side of a face that is in contact with the polarizing film) of the polyamide resin film (2) may be subjected to various surface treatments (such as corona discharge treatment, plasma treatment and anchor coating treatment).

The total thickness of the polarizing sheet according to an embodiment of the present invention is, for example, from 60 to 3000 μm, preferably from 100 to 2000 μm, and more preferably from 150 to 1000 μm.

The polarizing sheet according to an embodiment of the present invention may have a curved shape. The polarizing sheet having a curved shape can be produced by subjecting the polarizing sheet to bending. The polarizing sheet only needs to be subjected to bending at least partially.

The polarizing sheet having a curved shape obtained as described above does not cause whitening, and has the curved shape with excellent precision, and thus is suitable as a material for a polarizing lens.

Polarizing Lens

The polarizing lens according to an embodiment of the present invention has a structure in which a polyamide resin-molded layer is laminated on a surface of a polyamide resin film (2) of a polarizing sheet having a laminate structure of a polyamide resin film (1)/a polarizing film/a polyamide resin film (2) described above.

The polyamide resin-molded layer can be produced by subjecting a heated and melted polyamide resin to injection molding.

The polyamide resin-molded layer is a resin-molded layer formed by subjecting a polyamide resin composition to molding by using a mold. The polyamide resin composition only needs to contain a polyamide resin as a main component and may include a polyamide resin or a mixture containing another resin besides the polyamide resin (such as thermoplastic resin) and additive(s) in the range that does not impair the effect of the present invention.

Among these, the polyamide resin is preferably an alicyclic polyamide resin [that is, polycondensation product of a diamine component and a dicarboxylic acid component and at least one of the diamine component or the dicarboxylic acid component is a compound having an alicycle (e.g., an alicyclic diamine, alicyclic dicarboxylic acid)], particularly preferably a polycondensation product of an alicyclic diamine and an aliphatic dicarboxylic acid, and especially preferably a polycondensation product having a repeating unit represented by Formula (ad), from the perspectives of excellent transparency, chemical resistance, impact resistance, oil resistance and dimensional stability.

The polyamide resin-molded layer can be formed by a publicly known method, such as a method in which a heated and melted polyamide resin composition is directly injected on a surface of the polyamide resin film (2) to mold, or a method in which a separately formed polyamide resin-molded layer is bonded on a surface of the polyamide resin film (2) with an adhesive. According to an embodiment of the present invention, because both the polyamide resin film (2) and the polyamide resin-molded layer are formed from polyamide resins and have excellent adhesive properties, it is possible to stably carry out fusion and integration by a simple and easy method in which the heated and melted polyamide resin composition is directly injected and molded on the polyamide resin film (2) surface, and a polarizing lens can be produced efficiently at a low cost by simplifying the production process.

The molding of the heated and melted polyamide resin composition can be carried out by using a mold and is carried out by subjecting a polyamide resin composition, which is heated and melted at a temperature, for example, from 180 to 350° C., preferably 200 to 330° C., and more preferably 230 to 320° C., to molding through a method such as a compression molding method, a transfer molding method, an extrusion molding method, an injection molding method, or an injection compression molding method.

The thickness of the polyamide resin-molded layer can be properly adjusted in the range that does not impair, for example, handleability and optical functions, and examples of the thickness include from 200 to 5000 μm, and preferably from 300 to 3000 μm.

The back face of the polyamide resin-molded layer (face arranged on the opposite side of a face that is in contact with the polyamide resin film) may be subjected to a processing treatment (such as hard coating, antireflection processing, antifogging processing, soil-resistant finish and mirror finishing) as needed.

The total thickness of the polarizing lens according to an embodiment of the present invention is, for example, from 0.5 to 25 mm, preferably from 0.8 to 10 mm, and particularly preferably from 1 to 5 mm.

Because each layer constituting the polarizing lens contains a polyamide resin as a main component in the polarizing lens according to an embodiment of the present invention, the polarizing lens is light-weight, less likely to crack even when a hole is directly formed, and is excellent in processability.

Furthermore, the polarizing lens according to an embodiment of the present invention has excellent chemical resistance. Such a polarizing lens can prevent problems such as corrosion caused by bringing the polarizing lens into contact with chemicals such as plasticizers contained in other component when the polarizing lens is combined with such a component for use. Therefore, the polarizing lens according to an embodiment of the present invention can be used as a lens for, for example, sunglasses, spectacles, and goggles.

Figure 2:
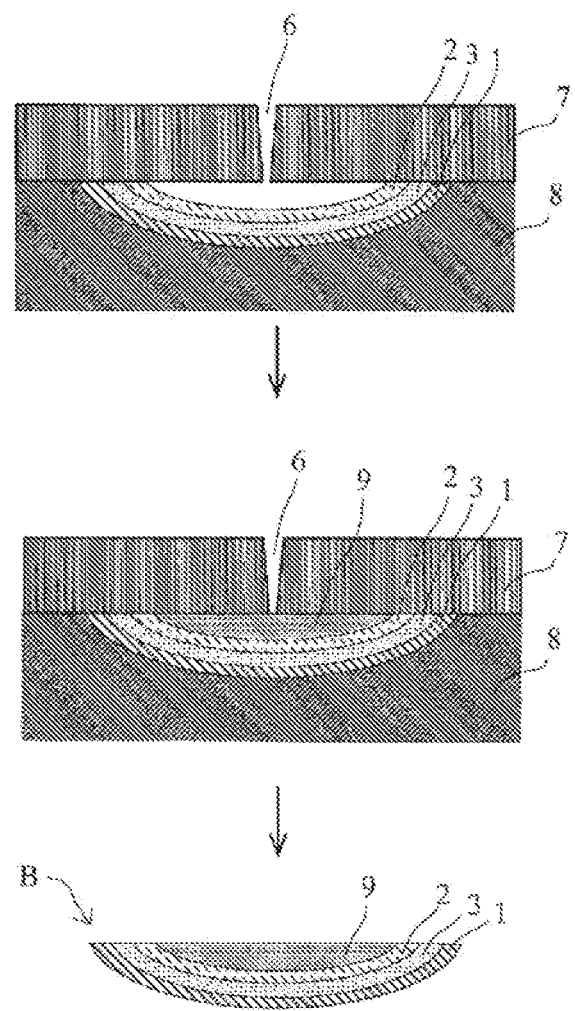
FIG. 2 is a schematic process chart illustrating an example of the production method of a polarizing lens according to an embodiment of the present invention.

An example of methods of producing the polarizing sheet and the polarizing lens according to an embodiment of the present invention is shown in FIGS. 1 and 2. FIG. 1 illustrates a process of subjecting a polarizing sheet, obtained by laminating the polyamide resin films (1) and (2) through an adhesive (not illustrated) on the both faces of the polarizing film, to bending by using a mold for bending. Furthermore, FIG. 2 illustrates a process for obtaining a functional optical lens by setting the polarizing sheet, to which bending has been carried out, on a mold for injection molding and thermally fusing the polyamide resin composition to the polarizing sheet by using the mold for injection molding (bottom mold and upper mold).

The method for carrying out bending to the polarizing sheet is not particularly limited and, for example, can be carried out by a method commonly used as a molding method that involves heating, such as vacuum molding and compression molding. According to an embodiment of the present invention, among these, a vacuum molding method is preferably used. In a method of carrying out bending by vacuum molding, for example, a plane-shaped polarizing sheet (the plane-shaped polarizing sheet may be a plane-shaped polarizing sheet heated in advance) is placed in a mold for bending that is heated (for example, heated at a temperature of 80° C. or higher but lower than 200° C., and preferably from 90 to 120° C.) in a manner that a side of the polyamide resin film (1) face of the polarizing sheet is directly in contact with the mold (in the case where a hard coat layer or the like is provided on the polyamide resin film (1) surface of the polarizing sheet, through the hard coat layer or the like), the polarizing sheet is tightly bonded to the mold by making the space between the polarizing sheet and the mold vacuum by suction through a vacuum hole provided on the mold, the concave shape on the mold is transferred to the polarizing sheet, and thus a polarizing sheet to which bending is carried out can be obtained.

The injection molding is carried out by setting a polarizing sheet to which the bending is carried out on a mold for injection molding (bottom mold) in a manner that a polyamide resin composition is thermally fused with the side of a polyamide resin film (2) face of the polarizing sheet, placing a mold for injection molding (upper mold) thereover, heating and melting a polyamide resin composition constituting the polyamide resin-molded layer at, for example, 180 to 350° C., and injecting the polyamide resin composition into an gap in the mold through an injection hole provided on the mold for injection molding (upper mold). Because the polyamide resin composition can be thus thermally fused and integrated with the surface of the polyamide resin film (2) constituting the polarizing sheet, a suitable molded article can be obtained without using an adhesive. In an example of FIG. 2, the polyamide resin-molded layer is laminated on a concave side (inner side) of the polarizing sheet having a curved shape; however, the arrangement is not limited to this. The polyamide resin-molded layer may be laminated on a protrusion side (outer side).

Spectacles

Spectacles according to an embodiment of the present invention have the polarizing lens described above. The spectacles include not only typical spectacles but also sunglasses and goggles.

Because the spectacles according to an embodiment of the present invention have polarizing lenses having a curved shape with excellent precision without whitening, the spectacles are light-weight and excellent in appearance.

EXAMPLE(S)

Hereinafter, the present invention will be described more specifically with reference to examples. However, the present invention is not limited by these examples.

Example 1

A polyamide resin film (1) (thickness: approximately 200 μm; stretching ratio: 1.6 times; retardation value: 2300 nm) formed from a polyamide resin (trade name "Trogamid CX7323", available from Daicel-Evonik Ltd.; Abbe number: 45; glass transition temperature: 140° C.) and a polyamide resin film (2) (thickness: approximately 100 μm; unstretched; retardation value: 30 nm) formed from the polyamide resin were bonded on the sides of a polarizing film (material: polyvinyl alcohol resin; thickness: 40 μm; available from Polatechno Co., Ltd.) through an adhesive (thickness: approximately 20 μm; adhesive composition obtained by mixing trade names "TM-595" and "CAT-10L", available from Toyo-Moton, Ltd., in a compounding ratio of 5:1 and subjecting the mixture to two-fold dilution with an ethyl acetate solvent) to form a polarizing sheet (1) (total thickness: 380 μm) having a layer structure formed from a polyamide resin film (1)/an adhesive/a polarizing film/an adhesive/a polyamide resin film (2). The difference between the retardation value of the polyamide resin film (1) and the retardation value of the polyamide resin film (2) was 2270 nm.

The obtained polarizing sheet (1) was placed in a concave surface of a mold heated to approximately 100° C. in a manner that the side of the polyamide resin film (1) face of the polarizing sheet (1) was in direct contact with the heated mold. By suction through a vacuum hole provided at the bottom of the mold, the polarizing sheet (1) was tightly put in the mold to carry out bending, through which the concave surface shape of the mold was transferred, and thus a curved polarizing sheet (1) was obtained. The obtained curved polarizing sheet (1) had no whitening and had a curved shape with good precision.

The obtained curved polarizing sheet (1) was set in a lens-shaped mold for injection molding in a manner that a polyamide resin was injected in the side of the polyamide resin film (2) face of the curved polarizing sheet (1). Then, a polyamide resin (same as described above) heated and melted at 300° C. was injected thereto to obtain a polarizing lens (1) in which a polyamide resin-molded layer is thermally fused directly onto the surface of the polyamide resin film (2) of the curved polarizing sheet (a polyamide resin film (1)/an adhesive/a polarizing film/an adhesive/a polyamide resin film (2)/a polyamide resin-molded layer; total thickness: 2.0 mm).

Comparative Example 1

A polarizing sheet (2) having a layer structure formed from a polyamide resin film (2)/an adhesive/a polarizing film/an adhesive/a polyamide resin film (2) was obtained in the same manner as in Example 1 except for using a polyamide resin film (2) (thickness: approximately 100 μm; unstretched; retardation value: 30 nm) in place of the polyamide resin film (1) (thickness: approximately 200 μm; stretching ratio: 1.6 times; retardation value: 2300 nm). The difference between the retardation values of the polyamide resin films arranged on the both sides of the polarizing film was zero.

When the bending was carried out to the polarizing sheet (2) in the same manner as in Example 1, the obtained curved polarizing sheet (2) had a curved shape with excellent precision but whitening occurred.

Comparative Example 2

A polarizing sheet (3) having a layer structure formed from a polyamide resin film (1)/an adhesive/a polarizing film/an adhesive/a polyamide resin film (1) was obtained in the same manner as in Example 1 except for using a polyamide resin film (1) (thickness: approximately 200 μm; stretching ratio: 1.6 times; retardation value: 2300 nm) in place of the polyamide resin film (2) (thickness: approximately 100 μm; unstretched; retardation value: 30 nm). The difference between the retardation values of the polyamide resin films arranged on the both sides of the polarizing film was zero.

When the bending was carried out to the polarizing sheet (3) in the same manner as in Example 1, the obtained curved polarizing sheet (3) had no whitening, but a curved shape with good precision was not achieved because tightening occurred.

To summarize the above, configurations according to embodiments of the present invention and variations are described below.

[1] A polarizing sheet including a polyamide resin film (1), a polarizing film and a polyamide resin film (2), the polarizing sheet having a structure in which the polyamide resin film (1), the polarizing film and the polyamide resin film (2) are laminated in this order, where a retardation value of the polyamide resin film (1) is from 10 to 3000 nm, and the retardation value of the polyamide resin film (1) and a retardation value of the polyamide resin film (2) satisfy Formula (r) below.

[Retardation Value of Polyamide Resin Film (1)]–[Retardation Value of Polyamide Resin Film (2)]≥10 nm (r)

[2] The polarizing sheet according to [1], where a thickness of the polyamide resin film (2) is from 10 to 2000 μm (preferably from 50 to 1000 μm, more preferably from 50 to 500 μm, and even more preferably from 50 to 200 μm).

[3] The polarizing sheet according to [1] or [2], where a thickness of the polyamide resin film (1) is from 50 to 1000 μm (preferably from 50 to 500 μm, more preferably from 100 to 400 μm, and even more preferably from 150 to 300 μm).

[4] The polarizing sheet according to any one of [1] to [3], where the polyamide resin is an alicyclic polyamide resin.

[5] The polarizing sheet according to any one of [1] to [3], where the polyamide resin is a polycondensation product of an alicyclic diamine and an aliphatic dicarboxylic acid.

[6] The polarizing sheet according to any one of [1] to [3], where the polyamide resin is a polycondensation product of a compound in which $L^1$ of Formula (a) is a divalent alicyclic hydrocarbon group (preferably a crosslinking ring or a cycloalkene ring that may have a substituent or a group obtained by removing two hydrogen atoms from a structural formula of a linked ring in which two or more selected from the group consisting of the cycloalkene rings and the crosslinking rings are bonded through a single bond or a linking group) and a compound in which $L^2$ of Formula (c) is a divalent aliphatic hydrocarbon group (preferably a straight-chain or branched alkylene group having from 1 to 20 carbons or a straight-chain or branched alkenylene group having from 2 to 20 carbons, and particularly preferably a straight-chain or branched alkylene group having from 1 to 20 carbons).

[7] The polarizing sheet according to any one of [1] to [3], where the polyamide resin is a compound having a repeating unit represented by Formula (ad).

[8] The polarizing sheet according to any one of [1] to [7], where a melting temperature (or a glass transition temperature) of the polyamide resin is from 100 to 350° C. (preferably from 100 to 320° C., more preferably from 100 to 250° C., even more preferably from 100 to 200° C., and yet even more preferably from 100 to 160° C.).

[9] The polarizing sheet according to any one of [1] to [8], where an Abbe number of the polyamide resin is from 35 to 65 (preferably from 40 to 65, more preferably from 40 to 55, and even more preferably from 40 to 50).

[10] The polarizing sheet according to any one of [1] to [9], where the retardation value of the polyamide resin film (1) is from 1000 to 3000 nm (preferably from 1500 to 3000 nm, more preferably from 2000 to 3000 nm, even more preferably from 2000 to 2800 nm, and yet even more preferably from 2000 to 2500 nm).

[11] The polarizing sheet according to any one of [1] to [10], where the retardation value of the polyamide resin film (2) is from 0 to 500 nm (preferably from 0 to 200 nm, more preferably from 0 to 100 nm, and even more preferably from 0 to 50 nm).

[12] The polarizing sheet according to any one of [1] to [11], where a difference between the retardation value of the polyamide resin film (1) and the retardation value of the polyamide resin film (2) is 1000 nm or greater (preferably 1500 nm or greater, and more preferably 2000 nm or greater).

[13] The polarizing sheet according to any one of [1] to [12], where the polarizing sheet has a curved shape.

[14] A method for producing a polarizing sheet, the method including: placing a polarizing sheet in such a manner that a side of the polyamide resin film (1) face of the polarizing sheet is in contact with a mold for curved surface molding, allowing the polarizing sheet to be tightly bonded to the mold by making a vacuum space between the polarizing sheet and the mold, and transferring a shape of the mold to the polarizing sheet to form a polarizing sheet having a curved shape described in [13] by allowing the polarizing sheet to have the curved shape.

[15] A polarizing lens including a structure in which a polyamide resin-molded layer is laminated on a surface of the polyamide resin film (2) of the polarizing sheet described in any one of [1] to [13].

[16] A spectacle including a polarizing lens described in [15].

INDUSTRIAL APPLICABILITY

The polarizing sheet according to an embodiment of the present invention can prevent whitening because, even when the polarizing sheet is subjected to bending, a stress applied by the bending is canceled out by the strain imparted to the polyamide resin film (1). Furthermore, the polarizing sheet is light-weight, less likely to crack even when a hole is directly formed, and excellent in processability. Furthermore, chemical resistance is also excellent.

Therefore, using the polarizing sheet according to an embodiment of the present invention, a polarizing lens having a curved shape with excellent precision and no whitening can be produced, and the spectacles provided with such polarizing lenses are light-weight, excellent in appearance, resistant to distortion of images, and gentle on eyes when worn for a long period of time.

REFERENCE SIGNS LIST

1 Polyamide resin film (1)
2 Polyamide resin film (2)
3 Polarizing film
4 Mold for processing
5 Vacuum hole
6 Injection hole
7 Mold for injection molding (upper mold)
8 Mold for injection molding (bottom mold)
9 Polyamide resin-molded layer
A Polarizing sheet
A' Polarizing sheet having a curved shape
B Polarizing lens

The invention claimed is:

1. A method for producing a polarizing sheet having a curved shape, the method comprising:
placing a polarizing sheet including a polyamide resin film (1), a polarizing film, and a polyamide resin film (2) disposed in this order in such a manner that the polyamide resin film (1) side of the polarizing sheet is in contact with a mold heated at a temperature from 80 to 120° C. for curved surface molding;
bringing the sheet into close contact with the mold; and
transferring a shape of the mold by a vacuum molding method to the sheet to bring the sheet to have a curved shape,
wherein a retardation value of the polyamide resin film (1) is from 2000 to 2500 nm, and the retardation value of the polyamide resin film (1) and a retardation value of the polyamide resin film (2) satisfy Formula (r):
2000 nm<[Retardation Value of Polyamide Resin Film (1)]−[Retardation Value of Polyamide Resin Film (2)] <2500 nm (r).

2. The method for producing a polarizing sheet having a curved shape according to claim 1, wherein the polyamide resin film (2) has a thickness from 10 to 2000 μm.

3. The method for producing a polarizing sheet having a curved shape according to claim 1, wherein the polyamide resin film (1) comprises an alicyclic polyamide resin.

4. The method for producing a polarizing sheet having a curved shape according to claim 3, wherein the alicyclic polyamide resin has a repeating unit represented by Formula (ad) below:

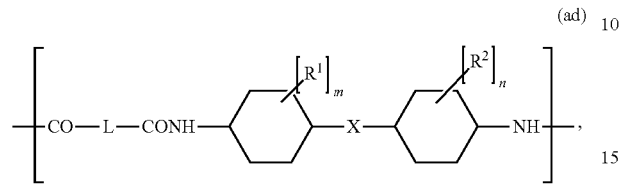

where X represents a single bond or a divalent hydrocarbon group, L represents a divalent hydrocarbon group, $R^1$ and $R^2$ each represent an alkyl group, and m and n each represent an integer from 0 to 4.

5. A method for producing a polarizing lens, the method comprising:
producing a polarizing sheet having a curved shape by the method according to claim 1; and
thermally fusing a polyamide resin composition to the polyamide resin film (2) side of the polarizing sheet.

6. A method for producing spectacles including a polarizing lens,
the method comprising:
producing a polarizing sheet having a curved shape by the method according to claim 1; and
thermally fusing a polyamide resin composition to the polyamide resin film (2) side of the polarizing sheet.

* * * * *